United States Patent
Grott

(10) Patent No.: US 7,823,641 B2
(45) Date of Patent: *Nov. 2, 2010

(54) METHODS OF FORMULATING CEMENTS FOR DRILLED WELLS USING PROCESSED WASTE WATER

(75) Inventor: Gerald J. Grott, Phoenix, AZ (US)

(73) Assignee: Ecycling, LLC., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/286,139

(22) Filed: Sep. 29, 2008

(65) Prior Publication Data

US 2009/0065201 A1    Mar. 12, 2009

Related U.S. Application Data

(62) Division of application No. 11/643,477, filed on Dec. 21, 2006, now Pat. No. 7,717,173.

(51) Int. Cl.
*E21B 33/13* (2006.01)

(52) U.S. Cl. ...................... 166/292; 166/285

(58) Field of Classification Search ............... None
See application file for complete search history.

(56) References Cited

U.S. PATENT DOCUMENTS

| 3,071,481 | A | * | 1/1963 | Beach et al. ................ 106/719 |
| 3,754,953 | A | | 8/1973 | Martin |
| 4,455,169 | A | * | 6/1984 | Chatterji et al. ............. 106/720 |
| 7,455,109 | B2 | * | 11/2008 | Collins ....................... 166/275 |

OTHER PUBLICATIONS

Morris Chemicals Incorporated, Why Calcium Chloride in Concrete?, 2008.

* cited by examiner

*Primary Examiner*—Zakiya W Bates
*Assistant Examiner*—Angela M DiTrani
(74) *Attorney, Agent, or Firm*—Barbara J. Luther; The Luther Law Firm

(57) ABSTRACT

In oil or gas well drilling, saline water is collected and separated into first and second streams of solid or liquid products containing salts. The first products are used in formulating cements for fabricating drilled well casings.

2 Claims, 2 Drawing Sheets

METHODS OF FORMULATING CEMENTS FOR DRILLED WELLS USING PROCESSED WASTE WATER

RELATED APPLICATIONS

This application is a division of co-pending application for U.S. patent Ser. No. 11/643,477, filed Dec. 21, 2006 now U.S. Pat. No. 7,717,173.

The present invention relates to methods of formulating drilling cements using processed waste water and products resulting from such processing.

BACKGROUND OF THE INVENTION

Water purification typically produces a first effluent of relatively "clean water" and a second effluent of "waste water" which include unwanted contaminants. The softening of hard water by the removal of calcium and magnesium is required for both industrial and household use. Known water softening processes proceed either by way of ion-exchange, membrane softening or precipitation. In the ion-exchange processes, the calcium and magnesium ions are exchanged for sodium and regeneration of the ion-exchange resin is achieved with a large excess of sodium chloride. This processes creates a regeneration effluent being a relatively concentrated aqueous solution of sodium, calcium and magnesium chlorides which is normally discarded. Consequently, by this method, considerable amounts of sodium, calcium and magnesium salts in solution are lost.

Alternatively, it is possible to use weak acid resins which exchange hydrogen ions for calcium and magnesium, and to regenerate the spent resins with a mineral acid. While this method creates less waste water, it is more expensive and yields relatively acidic soft water which is corrosive.

Membrane softening concentrates the calcium, magnesium salts and salts of other divalent ions to produce waste waters which require costly disposal.

The precipitation process is carried out by the "lime soda" process, in which lime is added to hard water to convert water-soluble calcium bicarbonate into water-insoluble calcium carbonate. This process also results in waste water which is difficult to filter and requires cumbersome treatment.

Accordingly, it would be highly advantageous to provide improved methods of disposing of salty waste waters by methods which provide a beneficial use of the waters which preserves the value of the salts.

SUMMARY OF THE INVENTION

Briefly, in accordance with the invention, I provide methods for economically and efficiently using waste waters produced by water purification and particularly waste waters produced from oil and gas wells and irrigation drainage.

The waste waters used in practicing the present invention are waters which are produced as a result of the purification of water, and particularly purified oil field production waters and irrigation drainage, which results in a first effluent of clean water and a second effluent of a waste water which must typically must be disposed of.

Typical water purification processes used to provide the second effluent waste water used in the present invention include osmosis, electro-dialysis, distillation, evaporation, ion exchange and lime softening. These processes create waste water having various levels of salt content. For the purposes of this invention, I define "waste water" as water containing about 0.15% or more by weight of the sodium, potassium, calcium or magnesium salts of hydrochloric, sulfuric and/or carbonic acids or combinations thereof.

Practice of the present invention includes the processing of waste waters to produce products which are useable in within the oil industry. More particularly, I have discovered that the water softening of waste waters produced from oil field operation produces two effluents, both of which can be used for oil field applications. For practicing this embodiment of the invention, preferably the waste water is analyzed to confirm that it is free of hazardous materials, such as heavy metals. The waste water is then softened to produce a first "clean" effluent having increased sodium and potassium and a second regeneration effluent having increased calcium and magnesium.

Because oil field waste waters tend to have substantially high salt contents, even the "clean" effluent of softening will typically have a salt content of 0.15% by weight or more of salt. Accordingly, this clean water would ordinarily be too salty for potable use and would have to be discarded. However, in accordance with the invention, the first effluent from water softening is used as an additive for cement for fabricating oil well casings.

DETAILED DESCRIPTION OF THE PREFERRED EMBODIMENTS

Figure 1:
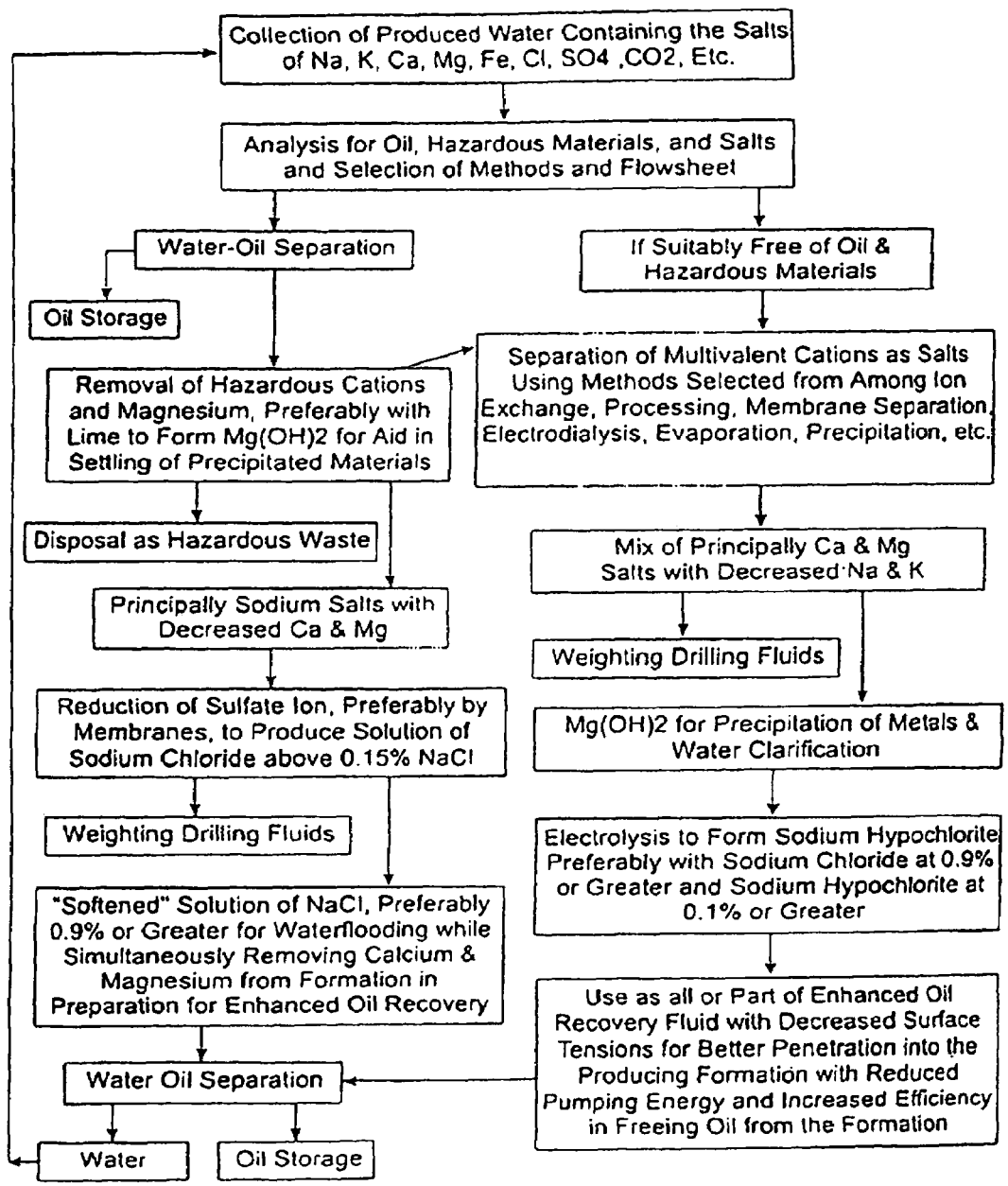
FIG. 1 is a flow sheet illustrating a preferred embodiment of the invention in which the products of water purification processes are used in the oil industry, for example, in Enhanced Oil Recovery methods.

Water softening is the removal of the "hardness" from the water which means predominantly removing or altering the calcium and magnesium ions from the water. Several methods for effecting water softening are known. The best known process for softening water is "ion-exchange." Ion-exchange entails the exchange of sodium, which is introduced into water, for calcium, magnesium, iron and other divalent mineral ions which are transferred out of the water and into a resin. When the resin approaches saturation with these "hard" ions, the resin is regenerated most often with solutions of sodium chloride leaving an effluent containing 3-25% sodium, calcium and magnesium salts which, normally, must be disposed of. The exact concentration of the effluent depends on the shop practice and, in particular, on the amount of rinse water included in the effluent, if any. Less often mineral acids like sulfuric acid or hydrochloric acid are used for water softening and these also produce effluents.

Membrane systems have recently become economically feasible. These systems, such as electro-dialysis and reverse osmosis, include the use of a membrane which also produces a salty effluent. For critical uses such as electronics, and particularly for use in the manufacture of computer chips, the first product of clean water may be further purified by dual bed or mixed bed ion-exchange treatment. This "polishing treatment" also produces an effluent containing the removed salts.

Each of these water purifying processes produces a clean water effluent and a waste water effluent which is expensive and difficult to dispose of.

For the purposes of this invention, "waste water" is defined as any water containing sufficient salts as to have no presently acceptable use due to costs or contamination levels. In general, waste water containing about 0.15% or more by weight of the sodium, potassium, calcium, magnesium and/or iron salts of hydrochloric, sulfuric and/or carbonic acids, or combinations thereof are considered as having no acceptable use and must be disposed of.

It has also been discovered that the products produced from water separation processing of waste waters have extensive application in the drilling industry. The water separation processes include, but are not limited to, ion exchange, membrane separation, electro-dialysis, evaporation, precipitation, and known "salting out" processes, etc. The water separation processes are believed to have particular usefulness for oil and gas drilling, and accordingly, the following is described with particular emphasis to oil and gas drilling. However, the water separation processes of the present invention have broad application throughout various drilling industries including for use with wells drilled for water, carbon dioxide, nitrogen, natural gas, and oil.

Contaminants not ordinarily found in other waste waters are common in produced waters from oil and gas wells. Waste water from oil and gas wells most often contain metals in higher amounts than in waste waters from other sources. The high volume uses of waters such as for water flooding and the use of formulated solutions for enhanced oil and/or gas recovery have further restrictions on those cations like calcium and magnesium and the anions like bicarbonate, carbonate and sulfate that can combine to form solids that hinder oil and/or gas recovery, particularly at temperatures of 300° F. and higher. The challenges for recycling are such that a report from Department of Petroleum Engineering, Texas A&M, states that of the 390 million gallons per day of excess produced water in the Permian Basin, only 1% is re-used and the remaining 350,000,000 gallons per day goes to disposal using re-injection wells. It would be highly beneficial if useful water and materials could be recovered from these waters.

Despite the above described challenges, it has been discovered that the products from purification of waste waters, including waste waters produced from oil and gas wells themselves, have extensive applications in the oil recovery industry. Where the oil or natural gas is produced from deeper formations, there is often enough heat available from the produced water, oil, and/or natural gas to materially improve the efficiency and the economics of recycling as compared with disposal as wastes. Additionally, the remote locations of many oil and gas resources adds premium value to local recycling by minimizing the energy use and time delays in transportation of materials to the drill site or production area and the costs associated with waste disposal without damaging the ecology. One geographical example for recycling is the use of centralized drilling areas and drilling platforms where first drilled wells may be producing waste water even while other wells are being drilled. In addition to the waste waters from the producing wells, there are waste waters from the purification of local brackish water or seawater for potable and other uses and, except for hazardous wastes, much or even all of these saline waste waters may be recycled instead of being discharged to waste disposal.

Figure 2:
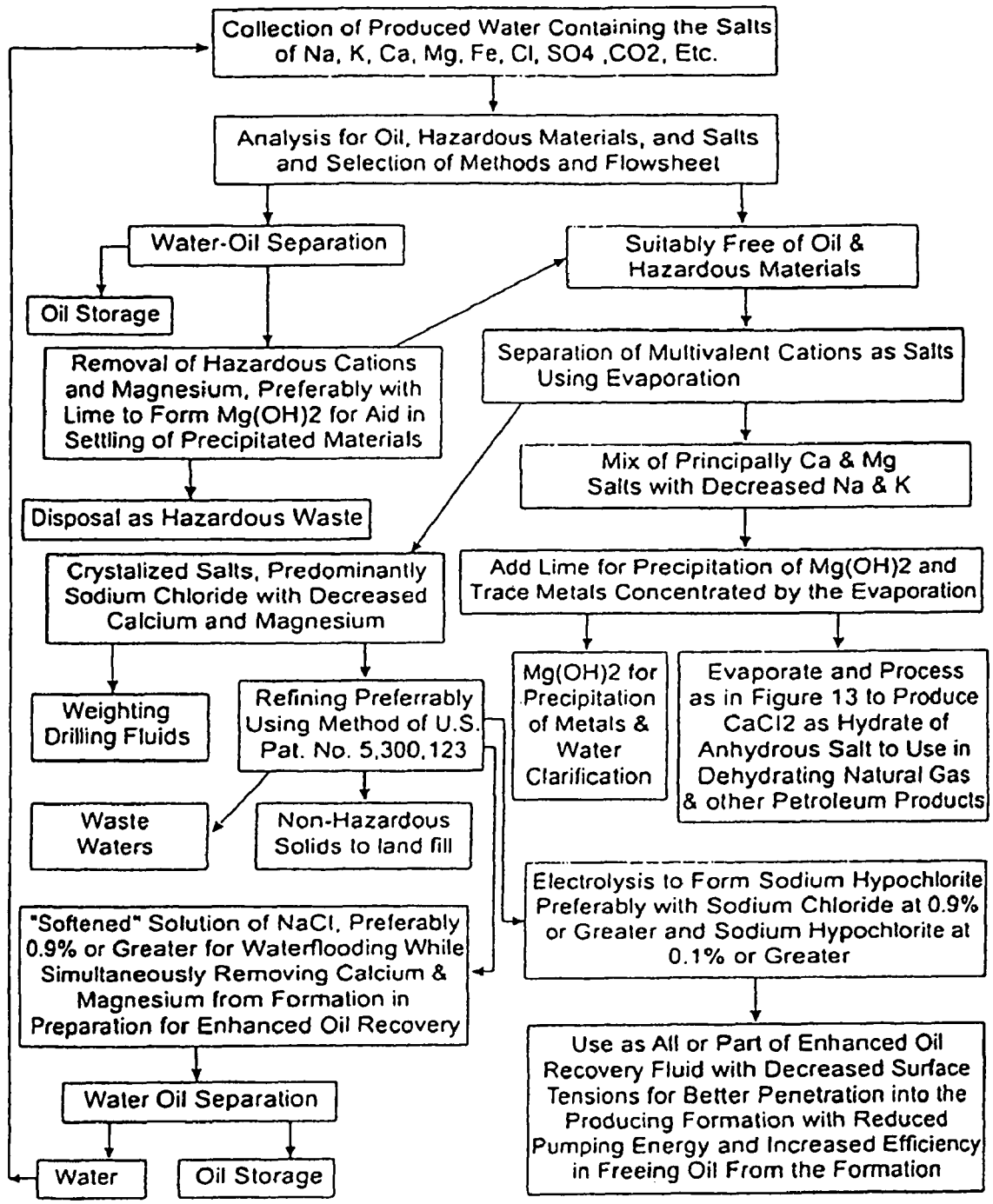
FIG. 2 is a flow sheet of another preferred embodiment of the invention using the products from water purification processes in oil field operations.

Described in general terms with reference to FIGS. 1-2, an embodiment of the present invention includes collecting the initial contaminated water having 0.15% by weight or more of salts of sodium, calcium, potassium, magnesium and/or iron salts of hydrochloric, sulfuric or carbonic acids and/or combinations thereof. The waste water is separation processed in which the amounts of salts in the effluents does not change, but the monovalent salts are separated from multivalent salts. Preferably, after testing for hazardous materials, the waste water is separated to produce two effluents. Where the initial contaminated water has a relatively low sodium content, it is possible that this water may be used for potable use. Where the contaminated water has exceedingly high sodium or high overall salt content, which is typical of waste waters produced from oil recovery, the first effluent will typically have a salt content, such as 0.15% or much greater, which is not acceptable for use as drinking water. However, it has been discovered that this first effluent, in its initial liquid state or further concentrated to even a substantially solid salt state, can be used for various applications within the oil industry.

Produced water from oil and gas wells are typically high in the chloride salts of sodium, potassium, calcium, and magnesium, with lesser amounts of potassium sulfate. The chloride salts have wide use in drilling oil and gas wells, while carbonate and sulfate anions can form troublesome precipitates with calcium and/or magnesium. After testing for and the removal of hazardous or otherwise detrimental materials, one or more separation processes are chosen to preferentially separate the sodium and potassium chlorides as brine or solids from calcium and magnesium chlorides or other multivalent salts. I have discovered that calcium chloride, after removal of magnesium by precipitation using lime, is effective when used to accelerate the setting of cement.

The various uses within the oil industry for the first effluent produced from separation processing of waste water are described above. However, it has also been discovered that waste water, including water produced from oil and gas wells, having a reduced sodium and potassium salts content and increased calcium and magnesium content, can also be used in the oil industry. Typically this second effluent containing predominantly calcium and magnesium chlorides will have a salty content of 1% or greater by weight. In addition, this salty brine can be further concentrated by solar evaporation.

As indicated in FIGS. 1-2, the second product can be either a liquid or substantially solid salt product if subjected to sufficient evaporation, and will have an increase in calcium and magnesium content compared to the untreated contaminated water. When the magnesium content is higher than desired, the magnesium can be precipitated as magnesium hydroxide, preferably by the addition of lime which forms additional calcium chloride of increased molecular weight as compared with magnesium chloride. The magnesium chloride is collected and used for treating waste waters to clarify them.

Presently, the operation of oil fields typically produces substantial unwanted waste water having 0.15% by weight or greater of the salt of sodium, calcium, potassium, magnesium and iron salts of hydrochloric, sulfuric or carbonic acids, or combinations thereof. Previously, this waste water would have to be disposed of at high cost. This high cost would be passed on to the consumer by way of increased oil prices. Now, the waste waters can be water separated "on site" for use in the very same drilling fields. Often the oil field waste waters have salt contents far greater than 0.15% which results in a water separated effluent and a regenerative brine which previously could not be used. Indeed, it is anticipated that the water separating of waste waters collected from an oil field site will typically produce a first effluent having greater than 0.15% by weight of salts, and containing a higher sodium and potassium content, and a second regenerative brine typically having greater than 3.0% by weight of salt and having an increased calcium and magnesium content. However, these products, as described above, still have usefulness within the oil industry.

These variations in waste water constituents that are specific to the local conditions require the use of various methods of water purification and use, which may be selected and practiced according to the flow sheets in FIGS. 1-2. Testing by chemical and/or mechanical separation for oil, suspended solids, and metals as well as the more common salts, such as the sodium, potassium, calcium, magnesium or iron salts of hydrochloric, sulfuric or carbonic acids or mixtures thereof will indicate which processes are preferred for water purification, and their sequence of use, so as to ascertain the optimum point in the flow sheet for the removal of contaminants to levels required for the intended use.

An example of one of the preferred methods of processing and using waste waters produced from oil fields is illustrated in FIG. 1, which illustrates a general example of the process of the present invention for analyzing local conditions of waste waters for selecting the best practice of the present invention. A first step in the process may include testing of the waste waters for oil, hazardous materials and salt content. Depending upon the results of such analysis, contaminants may be removed as shown in one of the paths shown in FIG. 1. However, in the first stage separation of salts of monovalent cations, predominantly sodium and potassium, which are separated from salts of multivalent cations, predominantly calcium and magnesium, other metals will report with the calcium and magnesium chlorides which are concentrated in a reduced volume of solution. This allows the removal of other metals by precipitation along with magnesium by the addition of high pH hydroxides preferably lime, as either calcium oxide or hydroxide, and/or sodium hydroxide of potassium hydroxide. It is well known that the flocs of precipitated magnesium hydroxide aid in the settling of co-precipitated metal hydroxides and other particulates. The use of lime is preferable because the cost is lower than for sodium or potassium hydroxide and the use of lime produces a weight of calcium chloride greater than the reduction in weight of magnesium chloride. Having noted that a wide range of analyses and a wide range of recycled products can be produced, FIG. 1 is presented as a generalized flow sheet. Typically these processes are cost competitive with evaporation up to about 15,000 mg/l TDS but, again, local conditions are the determining factor.

FIG. 2 illustrates an additional embodiment of the invention which is preferably practiced where the waste waters possess constituents different than those processed in FIG. 1. With reference to FIG. 2, the brine from Permian Basin is used in this example. After evaporation in solar ponds to crystallize the monovalent sodium and potassium chlorides and reduce their content preferably to about 1% or less, the recovered sodium chloride, here described as the first effluent, will total about 62,500 tons/year. The remaining brine, here described as the second effluent, will contain 5,160 tons/year of calcium-magnesium chlorides along with 500 tons/year of sodium chloride. This concentration is near the highest practical working concentration because of the influence of temperature on the solubility of calcium and magnesium chloride, where even slight drops in temperature below 60° F. causes hydrates to form and settle in pumps, piping, valves and containers. Where transportation requires reduced weights, additional evaporation can be carried out to remove essentially all of the sodium chloride and to produce hydrates of calcium.

The crystallized sodium chloride is suitable for all of the uses of common solar salt, including weighting of drilling fluids, making salt saturated brine for drilling through salt formations and making salt saturated cement for securely sealing drilling casings penetrating salt formations. This salt, low in calcium and magnesium, has particular use in sodium separating water of up to 10,000 ppm to below 10 ppm hardness and suited for use in preflushing calcium and magnesium from a formation prior to the use of surfactants and/or polymers in Enhanced Oil recovery that requires sodium chloride.

Having described my invention in such terms as to enable one skilled in the art to understand and practice it and, having identified the presently preferred embodiments thereof,

I claim:

1. A method of formulating a cement for drilled well casings, comprising the steps in combination of:
   collecting contaminated water having 0.15% or more by weight of the salts of Na, Ca, Mg, K, Cl, $SO_4$ or $CO_3$ or combinations thereof;
   processing said contaminated water to separate:
      a first separated product having increased sodium chloride content, and
      a second separated product having decreased sodium chloride content; and
   adding said first separated product to a cement for drilled well casings.

2. A method of formulating a cement for sealing drilled well casings, comprising the steps in combination of:
   collecting contaminated water having 0.15% or more by weight of the salts of Na, Ca, Mg, K, Cl, $SO_4$ or $CO_3$ or combinations thereof;
   processing said contaminated water to separate:
      a first separated product having increased sodium chloride content, and
      a second separated product having decreased sodium chloride content;
   utilizing said first separated product to formulate a salt saturated cement; and
   providing said salt saturated cement for sealing a drilled well casing.

* * * * *